I. WOODWARD.
Straw Cutter.
No. 7,693.
Patented Oct. 1, 1850.
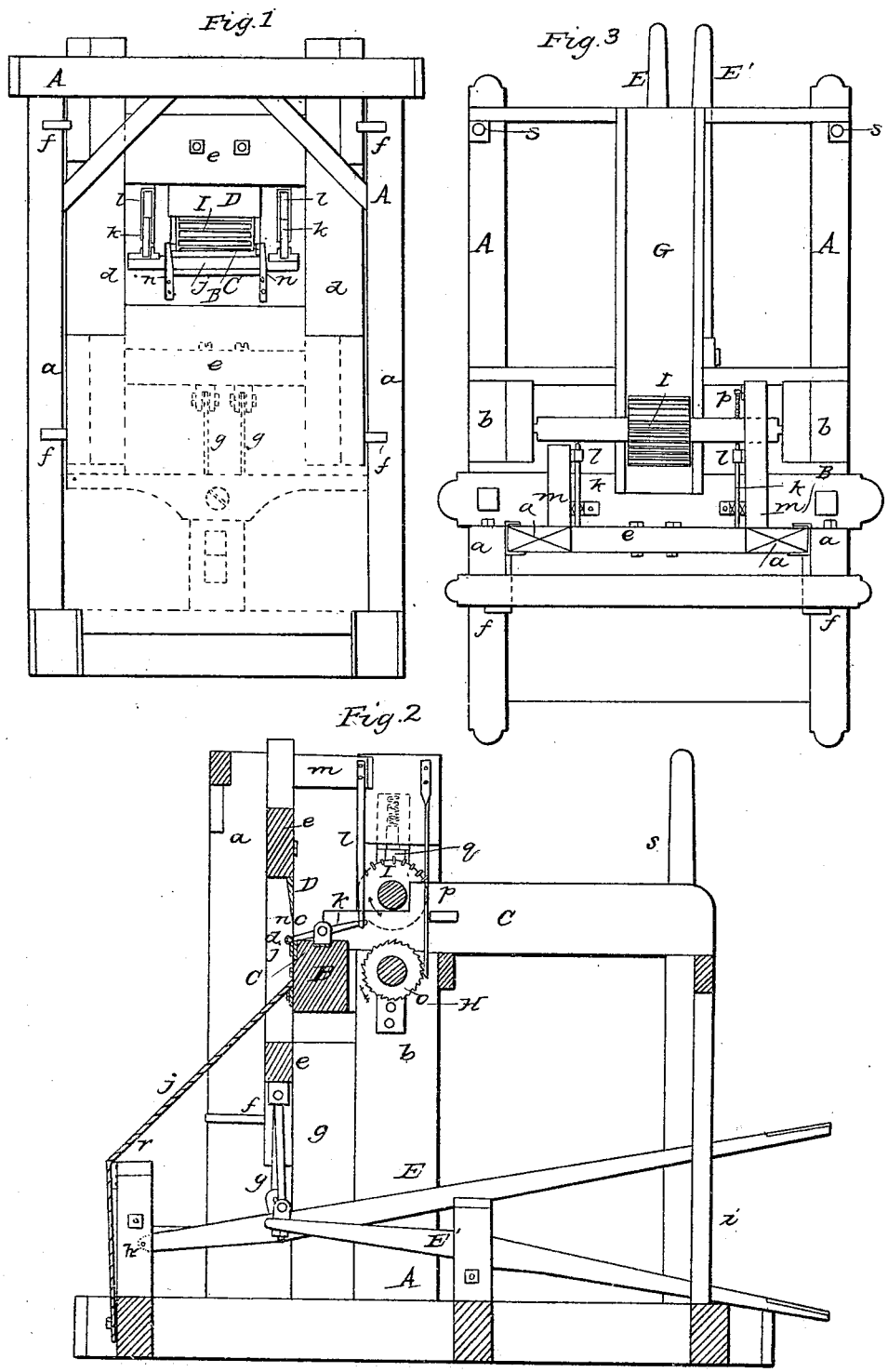

UNITED STATES PATENT OFFICE.

ISAAC WOODWARD, OF MECHANICSBURG, OHIO.

STRAW-CUTTER.

Specification of Letters Patent No. 7,693, dated October 1, 1850.

*To all whom it may concern:*

Be it known that I, ISAAC WOODWARD, of Mechanicsburg, in the county of Champaign and State of Ohio, have invented certain new and useful Improvements in Machines for Cutting Straw, Hay, and other Vegetable Substances, of which the following is a full, clear, and exact description, reference being had to the accompanying drawing, which forms part of this specification, and in which—

Figure 1 represents a front elevation of my straw cutter; Fig. 2 is a side elevation and Fig. 3 is a plan of the same.

In my improved machine the straw is cut by a knife to which a vertical reciprocating motion is imparted by a pair of treadles to which the feet of the operator are applied while at the same time the straw is supported against the action of the knife by a fixed jaw on the side at which the straw is fed and by a moving jaw on the opposite side. The straw is fed to the knife at each stroke by a pair of rollers to which an intermittent rotary motion is imparted by the treadles.

In the accompanying drawing A is the frame of the machine composed of timbers suitably framed and secured to each other. The front standards of this frame are arranged in pairs $a\ a$, $b\ b$, which are connected by cross bars, and support the horizontal beam B to which the fixed jaw C is secured. This jaw is furnished at each extremity with a leveled spur $c$ which guides the descending blade D so as to prevent it from cutting upon the fixed blade. The moving blade or jaw is secured to a horizontal bar forming the upper cross bar of an alternating gate composed chiefly of two uprights $d$ and two cross bars $e$. This gate is maintained in a vertical position by guides $f$, and is connected by link bars $g$ with a pair of treadles E E', which extend beyond the hinder end of the machine. One of these treadles (E) has its link bar hinged to it between its fulcrum or pivot ($h$) and its extreme end, the other is pivoted to the frame between its link bars and its hinder extremity, so that the depression of the hinder end of the one (E) draws down the gate with its knife, while the other (E') when depressed raises the gate. The treadles are guided in a vertical direction by upright guide bars $i$ secured to the hinder part of the frame. Immediately in front of the fixed jaw is a horizontal bar $j$ which is suspended from the front extremities of two levers $k$; the latter are hinged near their centers to the beam B; their hinder extremities projecting over the beam and passing through slotted rods $l$ which are secured to arms $m$ projecting from the cutter gate. From this arrangement of the levers $k$ and rods $l$, it is evident that when the gate is depressed the bar $j$ is raised, and when the gate is raised the bar is depressed. The bar is maintained at a distance from the face of the fixed jaw sufficient to allow the moving blade to pass freely between the fixed jaw and the bar, by two guides $n$ secured to the cutter beam B. A feeding trough G is extended from the cutter beam backward to the hinder part of the frame. This trough has an opening in its bottom board through which the upper portion of the periphery of a horizontal roller H is protruded, this roller has a ratchet wheel $o$ secured to its shaft which is acted upon by a spring ratchet $p$ depending from one of the arms of the cutter gate. Immediately above this roller is a second one I which is pressed down upon the lower one by springs acting upon the boxes $q$ in which the journals of its shaft revolve. The peripheries of both these rollers are furnished with projections which bite upon the straw introduced between them and, as the rollers are turned in the direction indicated by the arrows in the drawing, carry the straw forward between the moving knife and the lower jaw.

In order to protect the frame from the falling cut straw an apron J is secured by its upper edge to the cutter beam and is extended downward and forward over a bar $r$ to the front cross bar of the frame where its lower edge is made fast.

In working with this machine the operator places himself at the hinder part of the frame, applying his feet to the treadles and steadying himself by grasping with his hands the upper extremities of the two hindermost standards $s$ of the frame which are rounded for the purpose. The straw to be cut is then introduced in the feed trough and is entered between the feed rollers H I. The treadles are then alternately depressed by the operator and acting upon the cutter gate alternately raise and depress the upper blade D; as the gate rises the ratchet wheel $o$ turns the rollers and moves the straw forward over the fixed jaw, and as the blade descends the bar $j$ rising, by the action of the rods $l$ upon the levers $k$, supports the projecting ends of the straw during the action of the upper knife. As the upper blade raises the bar *j* descends thus leaving the end of the trough free for the protrusion of the straw. This moving bar also effects the cleansing of the upper blade, by shoving upward from its edge any gum or other matter that may accumulate upon it.

What I claim as my invention and desire to secure by Letters Patent is—

1. The combination of the moving cleansing bar (*j*) with the stationary blade (C) substantially in the manner and for the purpose herein set forth.

2. I also claim the treadles (E E') constructed and arranged substantially as herein set forth in combination with the cutter gate.

In testimony whereof I have hereunto subscribed my name.

ISAAC WOODWARD.

Witnesses:
JOHN P. SUTTON,
T. I. GLENDENING.